United States Patent
Zhao et al.

(10) Patent No.: US 11,330,268 B2
(45) Date of Patent: May 10, 2022

(54) APPARATUS AND METHODS FOR ENCODING AND DECODING A VIDEO SIGNAL

(71) Applicant: Huawei Technologies Co., Ltd., Shenzhen (CN)

(72) Inventors: Zhijie Zhao, Munich (DE); Johannes Sauer, Aachen (DE); Mathias Wien, Aachen (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/135,427

(22) Filed: Dec. 28, 2020

(65) Prior Publication Data

US 2021/0120250 A1 Apr. 22, 2021

Related U.S. Application Data

(63) Continuation of application No. PCT/EP2018/067696, filed on Jun. 29, 2018.

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/137* (2014.11); *H04N 19/172* (2014.11); *H04N 19/46* (2014.11)

(58) Field of Classification Search
CPC .. H04N 19/132; H04N 19/105; H04N 19/137; H04N 19/172; H04N 19/46;
(Continued)

(56) References Cited

U.S. PATENT DOCUMENTS

2017/0280141 A1 9/2017 Chou et al.
2017/0287107 A1 10/2017 Forutanpour et al.
(Continued)

FOREIGN PATENT DOCUMENTS

WO 2017205648 A1 11/2017
WO 2018009746 A1 1/2018
(Continued)

OTHER PUBLICATIONS

Fogg C et al: "Additional Supplemental Enhancement Information for AVC (Draft 2)", 31 .JCT-VC Meeting; Apr. 14, 2018; JCTVC-AE1006, May 11, 2018, XP030118381, 38 pages.
(Continued)

*Primary Examiner* — Marnie A Matt
(74) *Attorney, Agent, or Firm* — Conley Rose, P.C.

(57) ABSTRACT

A method for encoding a video signal includes generating an extension region of a first face of a reference frame, where the extension region includes a plurality of extension samples, and a sample value of each extension sample is based on a sample value of a sample of a second face of the reference frame, determining a use of an extension region, providing, based on the use, picture level extension usage information based on the extension region, and encoding the picture level extension usage information into an encoded video signal.

16 Claims, 13 Drawing Sheets

(51) Int. Cl.
*H04N 19/137* (2014.01)
*H04N 19/172* (2014.01)
*H04N 19/46* (2014.01)

(58) Field of Classification Search
CPC ...... H04N 19/70; H04N 19/88; H04N 19/597; H04N 19/117; H04N 19/174
USPC .................................................. 375/240.02
See application file for complete search history.

(56) References Cited

U.S. PATENT DOCUMENTS

| 2017/0323423 | A1 | 11/2017 | Lin et al. | |
| 2018/0020202 | A1* | 1/2018 | Xu | H04N 13/106 |
| 2019/0191170 | A1* | 6/2019 | Zhao | H04N 19/55 |
| 2019/0253732 | A1* | 8/2019 | Hendry | H04N 5/23238 |

FOREIGN PATENT DOCUMENTS

| WO | 2018035721 | A1 | 3/2018 | |
| WO | 2018045108 | A1 | 3/2018 | |
| WO | 2018059654 | A1 | 4/2018 | |
| WO | 2018067952 | A1 | 4/2018 | |
| WO | WO-2018131830 | A1 * | 7/2018 | ............ H04N 19/51 |

OTHER PUBLICATIONS

Johannes Sauer et al., Geometry correction for motion compensation of planar-projected 360VR video. Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0067, 11 pages.

"Revised text of ISO/IEC FDIS 23090 2 Omnidirectional Media Format" 122. MPEG Meeting;Apr. 16, 2018 Apr. 20, 2018; San Diego; (Motion Picture Expert Group or ISO/IEC JTC1/SC29/WG11) No. N17563, May 11, 2018, XP030024190, 182 pages.

Jill Boyce et al., HEVC Additional Supplemental Enhancement Information (Draft 4). Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, JCTVC-AC1005-v2, 56 pages.

Max Blaeser et al: "Description of SDR and 360 video coding technology proposal by RWTH Aachen University 3600part", JVET Meeting; Oct. 4, 2018; San Diego; (The Joint Video Exploration Team of ISO/IEC JTC1/SC29/WG11 and ITU-T SG.16);URL: http://phenix.int-evry.fr/jvet/, vol. Jvet-J0023, Apr. 12, 2018, XP055566194, 20 pages.

Minhua Zhou, AHG8: A study on compression efficiency of cube projection, Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0022, 7 pages.

Blaeser M., et al., "Description of SDR and 360 video coding technology proposal by RWTH Aachen University" 10. JVET Meeting; Apr. 10, 2018; San Diego;(The Joint Uideo Exploration Team of ISO/IEC JTC1/SC29/WG11 and ITU TSG .16); No. JVET-J0023-v3, Apr. 12, 2018, XP030151188, 102 pages.

Hung-Chih Lin et al., AHG8: Compact cube layout with tile partition. Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0104, 6 pages.

Mathias Wien, "High Efficiency Video Coding," Coding Tools and Specification. 2015, 331 pages.

* cited by examiner

APPARATUS AND METHODS FOR ENCODING AND DECODING A VIDEO SIGNAL

CROSS-REFERENCE TO RELATED APPLICATIONS

This application is a continuation of International Patent Application No. PCT/EP2018/067696 filed on Jun. 29, 2018, which is hereby incorporated by reference in its entirety.

TECHNICAL FIELD

Generally, the following description relates to the field of video coding. In particular, the following description relates to apparatuses and methods for encoding and decoding a video coding block of a video signal.

BACKGROUND

A 360° panoramic video signal comprises a sequence that captures the scene in all directions around a single view point. This is usually achieved using multiple cameras arranged near each other and with different view directions. The captured content is then stitched together and can be thought of as a sphere around the view point with texture on it, which represents the 360° scene or panoramic video signal at a certain point in time. Such a sphere, however, cannot be processed directly using current video codecs, which generally require a flat (i.e., two-dimensional (2D)) rectangular image of a scene. Thus, in order to process a panoramic video signal using current video codecs the sphere has to be converted to such a 2D format.

For converting the sphere into a 2D format comprising one or more faces one of the following projections are typically used.

An equirectangular projection defines a projection to a rectangle similar of the one that creates world maps from the globe of the earth. The sample density differs with different "heights". Extreme case are the poles of the sphere, they are mapped to lines. Geometrical distortions are spread all over the resulting image.

In a projection based on a cube the sphere is mapped to the faces or segments of a cube. Each face looks like a usual 2D image with no visible geometrical distortions. However, there are strong geometrical distortions in the boundary regions of the faces. There are multiple ways to arrange the faces in a rectangular format.

In a projection based on an icosahedron the sphere is mapped to the faces or faces of an icosahedron. Each face looks like a usual 2D image with no visible geometrical distortions. Also, in this case there are strong geometrical distortions in the boundary regions of the faces of the icosahedron. These distortions, however, are not as strong as in the case of a projection based on the cube format, since the angle between neighboring faces is smaller. There are multiple ways to arrange the icosahedron faces in a rectangular format.

Both the cube and icosahedron format consist of undistorted faces, which share the same camera center and edges.

In encoding and decoding of panoramic video signals comprising a plurality of faces the following problem can arise. Let there be two faces or faces which have the same camera center and share a border, i.e. face A and face B. The images of face A and B are recorded over time and arranged in subsequent frames of the panoramic video signal. This panoramic video signal is then encoded.

If the images of face A and B are not arranged next to each other in the sequence, motion compensation cannot be performed across their shared border. However, even if they are arranged such that they share the same border in the panoramic video signal as they share in 3D space, there is a geometrical distortion across their common border in the panoramic video signal. This degrades the performance of motion compensation at the border regions of the images of face A and B of the panoramic video signal.

Thus, there is a need for improved apparatuses and methods for encoding and decoding a video signal (e.g., a panoramic video signal) which comprises two or more faces that correspond to different image planes.

SUMMARY

It is an object of the apparatuses and methods to provide improved apparatuses and methods for encoding and decoding a video signal.

In the following description an apparatus and a method for encoding a video signal are disclosed. A face of a reference frame and an extension region derived from a reference frame using picture level extension usage information are used for encoding a current frame by inter-prediction. Apparatus and a method for decoding the encoded video signal using the same principles are also disclosed.

In an aspect an encoding apparatus for encoding a video signal is disclosed. The video signal comprises video content which includes video content of a first image plane and video content of a second image plane, the video content being provided in the form of a plurality of successive frames forming pictures, wherein each frame of the plurality of successive frames comprises a first face which comprises image content of the first image plane and a second face which comprises image content of the second image plane, the first face and the second face each comprising a plurality of samples, each sample being associated with a sample value. The apparatus comprises a processing circuitry configured to generate an extension region of the first face of a reference frame, the extension region comprising a plurality of extension samples, wherein the sample value of each extension sample is determined on the basis of a sample value of a sample of the second face of the reference frame. The processing circuitry is configured to determine a use of the extension region and, on the basis of the determined use, provide picture level extension usage information based on the generated extension region, and encode the picture level extension usage information into an encoded video signal.

It is beneficial to determine the use of extension regions so that only the extension regions that are actually needed will be generated using picture level extension usage information in the decoding phase (i.e. at a decoder). This reduces the decoding complexity as only needed extension regions are processed and they can be indicated in a reference frame so that generating additional samples can be avoided. Furthermore, it is beneficial to do this on picture level as this allows to benefit from the coding results of neighboring faces.

In an implementation the apparatus is configured to encode the picture level extension usage information after motion determination is finished for the whole picture.

In an implementation the apparatus is configured to determine whether there is movement across a face boundary (the movement may be determined, for example, from a first reference frame and a second reference frame), and as a response to whether there is movement to provide picture level extension the apparatus encodes the determination result into picture level extension usage information.

In an implementation the apparatus is configured to encode one or more of the following as extension usage information: indication of a possibility to reuse extension usage information of a picture with a different picture order count, indication of a possibility to derive the extension usage information from a signaled movement, indication of a need to adapt reused or derived information, wherein the information further comprises which faces require an adaptation, and a required size of the extension. It is beneficial to include one or more different indications in the picture level extension usage information so that the extension regions can be used more efficiently.

In an implementation, for faces which require further adaptation or signaling, the apparatus is further configured to encode one or more of the following as extension usage information: an indication whether the extension usage is derived from the opposite face, an indication whether the extension usage is derived from the connected faces, an indication for each face boundary specifying whether it should be extended, indication of reference pictures from past and future, and indication whether the extension usage of the future reference is derived from the past reference. It is beneficial to provide possibility to use further adaptation or signaling in order to make the picture level extension information more complete.

In an implementation apparatus is configured to encode the extension usage information in a supplemental enhancement information (SEI) message and/or in a picture parameter set (PPS), or another alternative parameter set.

In another aspect an apparatus for decoding an encoded video signal is disclosed. The encoded video signal comprises video content which includes video content of a first image plane and video content of a second image plane, the video content being provided in an encoded form of a plurality of successive frames forming pictures, wherein each frame of the plurality of successive frames comprises a first face which comprises image content of the first image plane and a second face which comprises image content of the second plane, the first face and the second face each comprising a plurality of samples, each sample having a sample value. The apparatus comprises processing circuitry configured to decode picture level extension usage information included in the encoded video signal, generate an extension region of the first face of a reference frame based on the decoded extension usage information, the extension region comprising a plurality of extension samples, wherein the sample value of each extension sample is determined on the basis of a sample value of a sample of the second face of the reference frame, and decode the encoded video signal using the extension region of the first face of the reference frame.

It is beneficial to determine the use of extension regions so that only the extension regions that are needed will be generated using picture level extension usage information at a decoder. This reduces the decoding complexity as only needed extension regions are processed such that decoding of additional samples can be avoided.

In an implementation the apparatus is configured to decode one or more of the following as picture level extension usage information: indication of a possibility to reuse extension usage information of a picture with a different picture order count, indication of a possibility to derive the extension usage information from a signaled movement, indication of a need to adapt reused or derived information, wherein the information further comprises which faces require an adaptation, and required size of the extension. It is beneficial to include one or more different indications in the picture level extension usage information so that the extension regions can be used more efficiently.

In an implementation, wherein for faces which require further adaptation or signaling, the apparatus is further configured to decode one or more of the following as picture level extension usage information: indication whether the extension usage is derived from the opposite face, indication whether the extension usage is derived from the connected faces, indication for each face boundary specifying whether it should be extended, indication of reference pictures from past and future, and indication whether the extension usage of the future reference is derived from the past reference. It is beneficial to provide possibility to use further adaptation or signaling in order to make the picture level extension information more complete.

In an implementation the apparatus is configured to decode the extension usage information in an SEI message and/or in a PPS, or in an alternative parameter set.

In an aspect a method for encoding a video signal is disclosed. The video signal comprises video content which includes video content of a first image plane and video content of a second image plane, the video content being provided in the form of a plurality of successive frames forming pictures, wherein each frame of the plurality of successive frames comprises a first face which comprises image content of the first image plane and a second face which comprises image content of the second image plane, the first face and the second face each comprising a plurality of samples, each sample being associated with a sample value. The method further comprises generating an extension region of the first face of a reference frame, the extension region comprising a plurality of extension samples, wherein for each extension sample the method further comprises determining the sample value of the extension sample on the basis of a sample value of a sample of the second face of the reference frame, determining use of extension regions and as a response to the determined use the method further comprises providing picture level extension usage information based on the generated extension regions, and encoding the provided picture level extension usage information into an encoded video signal.

It is beneficial to determine the use of extension regions so that only the extension regions that are needed can be generated using picture level extension usage information in the decoding phase at a decoder. This reduces the decoding complexity as only needed extension regions are processed and decoding of additional samples can be avoided. Furthermore, it is beneficial to do this on picture level as this provides possibility to benefit from the coding results of the neighboring faces.

In an implementation the method further comprises encoding the picture level extension usage information after motion determination is finished for the whole picture.

In an implementation, wherein the method further comprises encoding one or more of the following as extension usage information: indication of a possibility to reuse extension usage information of a picture with a different picture order count, indication of a possibility to derive the extension usage information from a signaled movement, indication of a need to adapt reused or derived information, wherein the information further comprises which faces require an adaptation, and required size of the extension. It is beneficial to include one or more different indications in the picture level extension usage information so that the extension regions can be used more efficiently.

In an implementation, wherein for faces which require further adaptation or signaling, the method further comprises encoding one or more of the following as extension usage information: indication whether the extension usage is derived from the opposite face, indication whether the extension usage is derived from the connected faces, indication for each face boundary specifying whether it should be extended, indication of reference pictures from past and future, and indication whether the extension usage of the future reference is derived from the past reference. It is beneficial to provide possibility to use further adaptation or signaling in order to make the picture level extension information more complete.

In an implementation the method further comprises encoding the extension usage information in an SEI message and/or in a PPS, or alternative parameter set.

In an aspect a method for decoding an encoded video signal is disclosed. The encoded video signal comprises video content which includes video content of a first image plane and video content of a second image plane, the video content being provided in an encoded form of a plurality of successive frames forming pictures, wherein each frame of the plurality of successive frames comprises a first face which comprises image content of the first image plane and a second face which comprises image content of the second plane, the first face and the second face each comprising a plurality of samples, each sample being associated with a sample value. The method comprises decoding picture level extension usage information included in the encoded video signal, generating an extension region of the first face of a reference frame based on the decoded extension usage information, the extension region comprising a plurality of extension samples, wherein the sample value of each extension sample is determined on the basis of a sample value of a sample of the second face of the reference frame, and decoding the encoded video signal using the extension region of the first face of the reference frame (e.g., in accordance with other decoded information).

It is beneficial to determine the use of extension regions so that only the extension regions that are needed can be generated using picture level extension usage information at the decoding phase by decoder. This reduces the decoding complexity as only needed extension regions are processed and decoding of additional samples can be avoided. Furthermore, it is beneficial to do this on picture level as this provides possibility to benefit from the coding results of the neighboring faces.

In an implementation the method further comprises decoding one or more of the following as picture level extension usage information: indication of a possibility to reuse extension usage information of a picture with a different picture order count, indication of a possibility to derive the extension usage information from a signaled movement, indication of a need to adapt reused or derived information, wherein the information further comprises which faces require an adaptation, and required size of the extension.

In an implementation, for faces which require further adaptation or signaling, the method the method further comprises decoding one or more of the following as picture level extension usage information indication whether the extension usage is derived from the opposite face, indication whether the extension usage is derived from the connected faces, indication for each face boundary specifying whether it should be extended, indication of reference pictures from past and future, and indication whether the extension usage of the future reference is derived from the past reference. It is beneficial to provide possibility to use further adaptation or signaling in order to make the picture level extension information more complete.

In an implementation, the method further comprises decoding the extension usage information in an SEI message and/or in a PPS, and/or another parameter set.

In an aspect a computer program is disclosed. The computer program comprises program code for performing the method of as described above when executed on a computer. The disclosure can be implemented in software, hardware, or a combination of hardware and software.

The foregoing and other objects are achieved by the subject matter of the independent claims. Further implementation forms are apparent from the dependent claims, the description and the figures.

As used herein, a video signal or video sequence is a set of subsequent frames presenting a motion picture. That is, a video signal or video sequence consists of a plurality of frames (i.e., pictures or images).

As used herein, coding tree unit (CTU) denotes the root of a coding structure of the video sequence of a pre-defined size, containing a part of a frame (e.g. 64×64 samples). A CTU can be partitioned into several coding units (CUs).

As used herein, coding unit (CU) denotes a basic coding structure of the video sequence of a pre-defined size, containing a part of a frame, which is belonging to a CTU. A CU can be partitioned into further CUs.

As used herein, prediction unit (PU) denotes a coding structure, which is the result of partitioning of a CU.

As used herein, a block denotes a group of samples. The block can have any shape, in particular square or rectangular. A sample may be a pixel or other representative value from which the final picture shown to a user may be constructed.

The devices and methods described herein may be used for inter-prediction between pictures to exploit the temporal redundancy of natural video sequences. The change of information observed between the current picture and a reference picture can often be approximated by translational movement, e.g. linear movement within the image plane. Block based motion compensation is the dominating realisation of this paradigm, where a reference picture is partitioned into rectangular blocks and each sample within a block is exhibiting the same motion. Thus, the movement of the entire block, called the prediction block, can be described by a single motion vector. The set of motion vectors over the whole reference picture defined a vector field, which is denoted as a motion vector field.

The principles discussed in the present description can be implemented in hardware and/or software.

BRIEF DESCRIPTION OF THE DRAWINGS

Example embodiments will be described with respect to the following figures.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present apparatuses and methods may be placed. It is understood that other aspects may be utilized and structural or logical changes may be made without departing from the scope of the claims. Thus, the following detailed description, therefore, is not to be taken in a limiting sense, for instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

Figure 1:
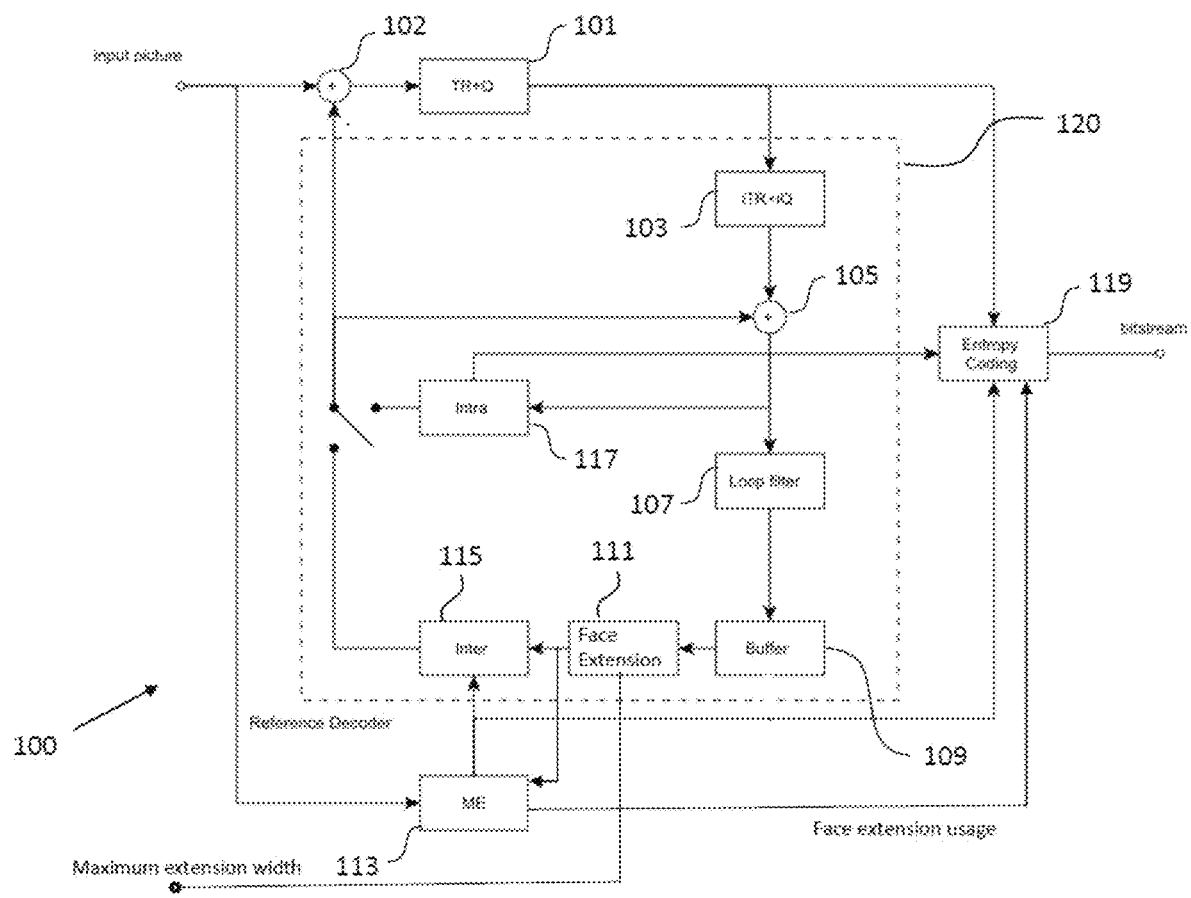
FIG. 1 shows a schematic diagram illustrating an apparatus for encoding a video signal.

FIG. 1 shows a schematic diagram illustrating an apparatus 100 for encoding a video coding block of a video signal according to an embodiment, wherein the video signal comprises a plurality of frames and each frame comprises a plurality of faces, including a first face and second face. Each face is associated with a different image plane and is dividable into a plurality of video coding blocks, wherein each video coding block comprises a plurality of samples and each sample is associated with a sample value. In an embodiment, the video coding blocks could be macro blocks, coding tree units, coding units, prediction units and/or prediction blocks.

The encoding apparatus 100 comprises a face extension unit 111 configured to generate an extension region of the first face of a reference frame comprising a plurality of extension samples, as will be described in more detail below. For each extension sample the face extension unit 111 is configured to determine the sample value of the extension sample on the basis of a sample value of a sample of the second face of the reference frame.

The encoding apparatus 100 further comprises an inter prediction unit 113, 115 configured to perform motion compensation of a video coding block of the first face of a currently processed frame, i.e. to generate a predicted video coding block on the basis of the co-located video coding block in the reference frame, on the basis of the samples of the first face of the reference frame and picture level extension usage information based on the generated extension regions as well as an encoding unit 101, 119 configured to generate an encoded video coding block on the basis of the predicted video coding block. As will be described in more detail further below, the encoding unit 101, 119 can comprise a transformation and quantization unit 101 and/or an entropy coding unit 119, which may receive face extension usage information as a parameter from a motion estimation unit 113.

The extension usage information mentioned above comprises information about extension regions, which may comprise one or more of the following data items: an indication of a possibility to reuse extension usage information of a picture with a different picture order count, an indication of a possibility to derive the extension usage information from a signaled movement, an indication of a need to adapt reused or derived information, wherein the information further comprises which faces require an adaptation, a required size of the extension.

For the faces which require further adaptation or signaling the extension usage information further comprises one or more of the following data items: an indication whether the extension usage is derived from the opposite face, an indication whether the extension usage is derived from the connected faces, an indication for each face boundary specifying whether it should be extended, an indication of reference pictures from past and future, and indication whether the extension usage of the future reference is derived from the past reference.

The embodiment of the encoding apparatus 100 shown in FIG. 1 is configured to encode the extension usage information in an SEI message and/or in a PPS, and/or in an alternative parameter set. Also, other possible messaging arrangements may be implemented.

The embodiment of the encoding apparatus 100 shown in FIG. 1 operates in the following way. A frame of the video signal, which includes a plurality of faces, such as 3×2 cube faces, is split into a plurality of non-overlapping video coding blocks. For each currently processed video coding block the predictor block, i.e. the predicted current video coding block, is subtracted by a subtraction unit 102 providing a residual video coding block. Then, the residual video coding block is transformed and quantized by the transformation and quantization unit 101 shown in FIG. 1 and entropy encoded by the entropy coding unit 119. Video coding blocks, which already have been encoded, are made available by the reference decoder 120. The reference decoder 120 comprises a reverse transformation and quantization unit 103, which reverses the operation of the transformation and quantization unit 101 (here a quantization error may be introduced). An addition unit 105 combines the residual video coding block with the predictor block to obtain a reconstructed video coding block, which is made available for intra prediction of other video coding blocks of the same frame using an intra prediction unit 117.

The reconstructed video coding block is possibly loop filtered by a loop filter unit 107 (choice can be made by a control unit of the encoding apparatus 100) and stored in a reference frame buffer 109. At this stage the reconstructed video coding block is also available for inter prediction of video coding blocks of other frames. If the reference frame buffer 109 is accessed, the face extension unit 111 can provide an extension region of the face comprising the current video coding block, as already mentioned above and as will be described in more detail further below.

As already mentioned above, the data provided by the face extension unit 111 is used by the inter prediction unit 115 for performing motion estimation and motion compensation. To this end, the encoding apparatus 100 shown in FIG. 1 further comprises a motion estimation unit 113. In other embodiments, the motion estimation unit 113 can be implemented as a part of the inter prediction unit 115. Generally, a control unit of the encoding apparatus 100 (not shown in FIG. 1) selects the currently processed video coding block and the prediction mode, i.e. intra or inter prediction, for predicting the currently processed video coding block. This information is also needed by the decoding apparatus 200 shown in FIG. 2 and hence also entropy coded into the bitstream by the entropy coding unit 119.

When a new picture is encoded the face extension procedure is performed for its reference picture before motion estimation is performed. As an implementation example, after motion estimation for the whole picture is finished, information about the face extension usage can be entropy coded and added to the bitstream.

In the example shown in FIG. 1 there is a separate input for maximum extension width shown, however, this is to be understood for better understanding. The maximum extension width may be taken as a parameter or it may be determined during the encoding process.

Figure 2:
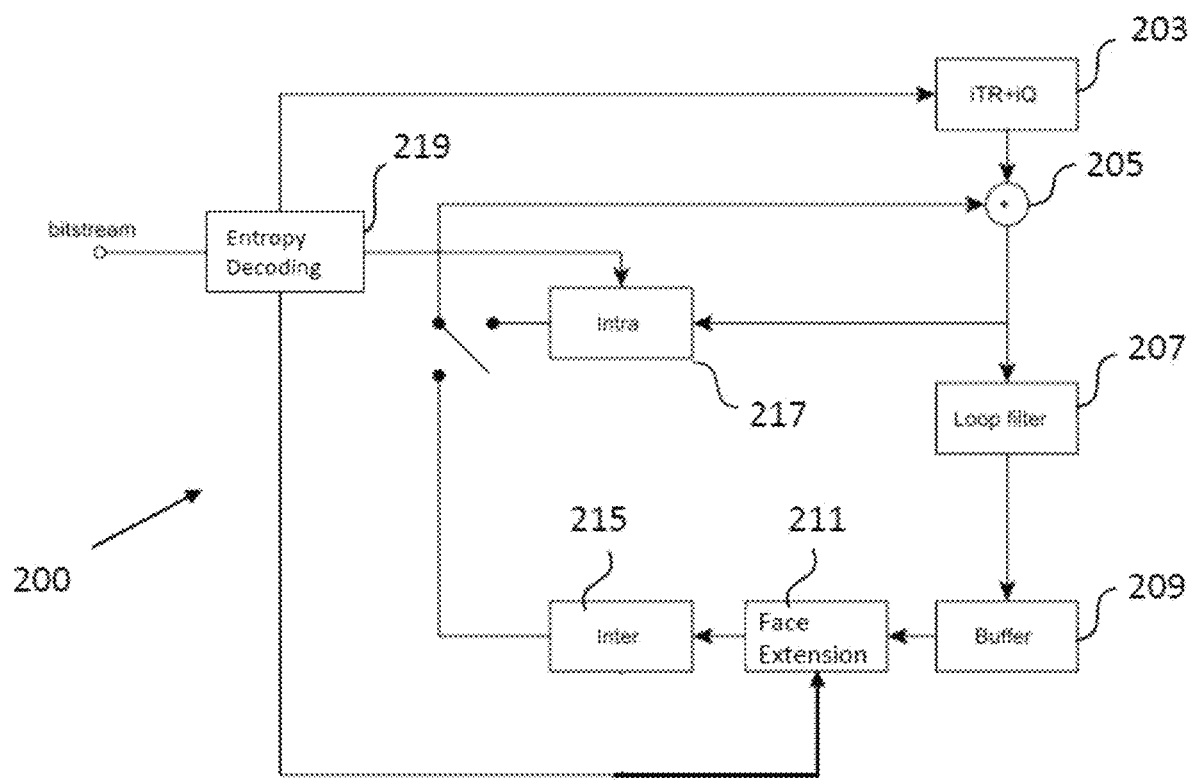
FIG. 2 shows a schematic diagram illustrating an apparatus for decoding a video signal.

FIG. 2 shows a schematic diagram illustrating an apparatus 200 for decoding an encoded video coding block of a video signal according to an embodiment, wherein the video signal comprises a plurality of frames and each frame comprises a plurality of faces, including a first face and second face. Each face is associated with a different image plane and is dividable into a plurality of video coding blocks, wherein each video coding block comprises a plurality of samples and each sample is associated with a sample value.

The decoding apparatus 200 comprises a decoding unit 203, 219 configured to decode a video coding block of the first face of a current frame for providing a residual video coding block. As will be described in more detail further below, the decoding unit 203, 219 can comprise a reverse transformation and quantization unit 203 and/or an entropy coding unit 219.

The decoding apparatus 200 further comprises a face extension unit 211 configured to generate an extension region of the first face of a reference frame comprising a plurality of extension samples based on the decoded extension usage information, wherein for each extension sample the face extension unit 211 is configured to determine the sample value of the extension sample on the basis of a sample value of a sample of the second face of the reference frame, as will be described in more detail further below.

The decoding apparatus 200 further comprises an inter prediction unit 215 configured to perform motion compensation of the video coding block of the first face of the current frame, i.e. to generate a predicted video coding block on the basis of the co-located video coding block in the reference frame, on the basis of the face picture level extension usage information that is decoded from the encoded video signal. The picture level extension usage information is decoded and parsed from the entropy coding unit 219 and the face extension is performed utilizing the extension usage information.

The decoding apparatus 200 further comprises a reconstruction unit 209 configured to reconstruct the video coding block of the current frame on the basis of the predicted video coding block and the residual video coding block.

The embodiment of the decoding apparatus 200 shown in FIG. 2 operates in the following way. A current frame of the video signal is split into a plurality of non-overlapping video coding blocks. The residuals of a currently processed video coding block, i.e. the residual video coding block, are decoded by the entropy coding unit 219 together with the corresponding parameters for inter and intra prediction. The residual video coding block is processed by the reverse transformation and quantization unit 203 and added by the addition unit 205 to the predicted video coding block for generating the reconstructed video coding block. The reconstructed video coding block is provided to an intra prediction unit 217 for intra prediction of other video coding blocks of the same frame. Moreover, the reconstructed video coding block can be loop filtered by a loop filter 207 (the choice can be made by a control unit of the decoding apparatus 200) and stored in a reference frame buffer 209. At this stage the reconstructed video coding block is also available for inter prediction of video coding blocks of other frames. If the reference frame buffer 209 is accessed, the face extension unit 211 can provide an extension region of the face in the reference frame, as already mentioned above and as will be described in more detail further below. The reference frame buffer 209 is configured to output processed frames in output order.

For more details about the some of the known units of the encoding apparatus 100 and the decoding apparatus 200 described above reference is made to the textbook "High Efficiency Video Coding", Mathias Wien, first edition, Springer-Verlag Berlin Heidelberg, 2015.

In an embodiment, the face extension unit 111 of the encoding apparatus 100 and the face extension unit 211 of the decoding apparatus 200 are configured for each extension sample of the extension region of the first face of the reference frame to determine the sample value of the extension sample on the basis of a sample value of a sample of the second face of the reference frame using a mapping configured to map the sample of the second face of the reference frame to the image plane of the first face of the reference frame according to the picture level extension usage information in such a way that the geometrical distortion across their common edge is compensated.

In the following FIGS. 3-7 principles of determining extension regions that are then used in determining the extension usage information are discussed.

Figure 3:
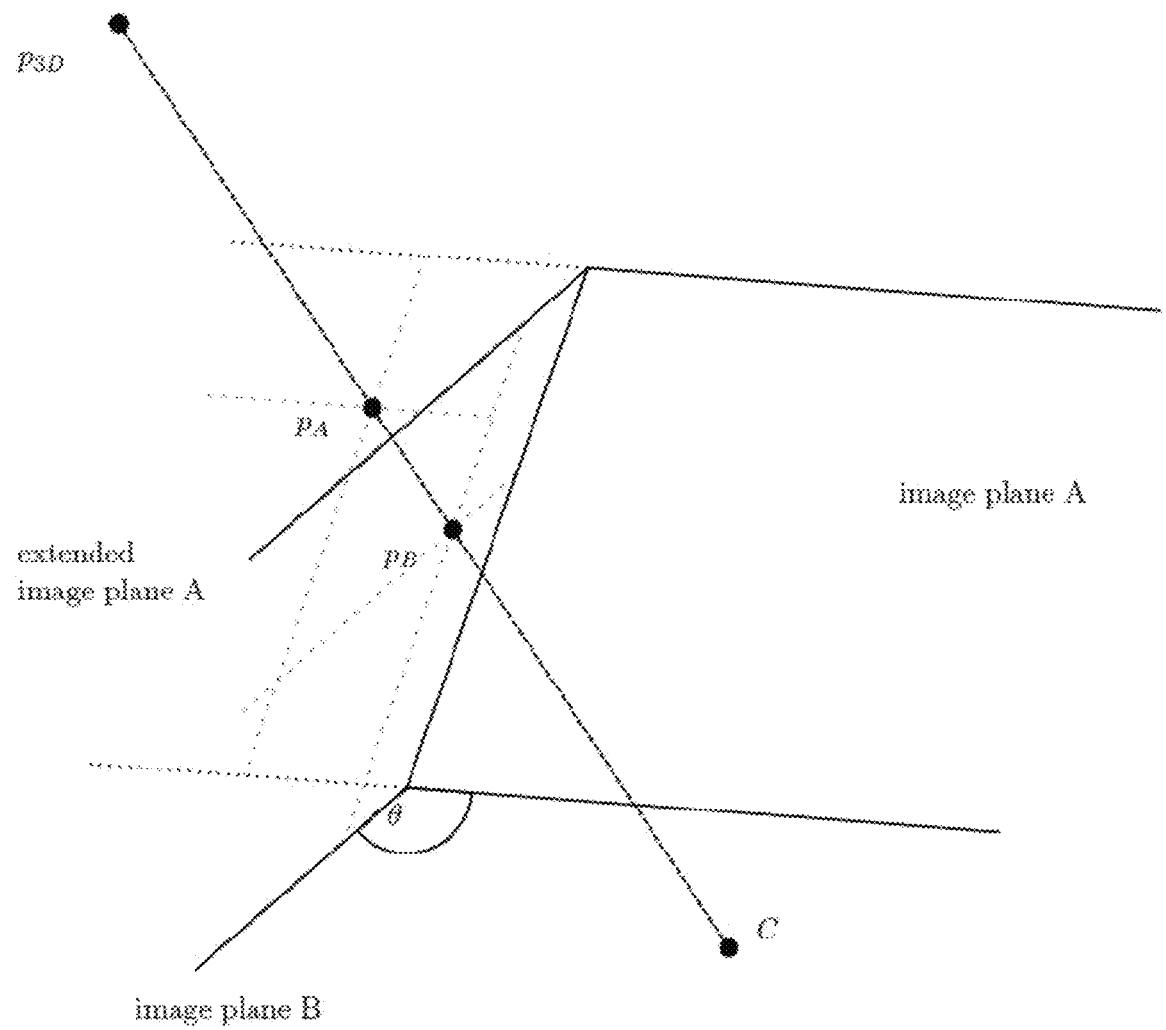
FIG. 3 shows a schematic diagram illustrating a geometrical transformation for generating an extension region implemented in an encoding apparatus and a decoding apparatus according to an example embodiment.

FIG. 3 illustrates a mapping or geometric transformation implemented in the face extension unit 111 of the encoding apparatus 100 and the face extension unit 211 of the decoding apparatus 200 that allows for a compensation of the geometrical distortion across the common edge of the first face and the adjacent second face of the reference frame. Here it is assumed that the first face (also referred to as face A being associated with an image plane A) and the second face (also referred to as face B being associated with an image plane B) have the same camera position or camera center C and share a border.

As can be taken from FIG. 3, a point $p_{3D}$ in 3D space lies on a ray through the camera center C, which intersects the image plane A and the image plane B. Consequently, a point $p_B$ in the image plane B can be projected or mapped to a point $p_A$ in the image plane A. For this operation no knowledge of the distance of the 3D point $p_{3D}$ from the camera center C is required.

Mathematically, this can be expressed in the following way. The point $p_{3D}$ can be expressed as a vector in 3D space, i.e. $p_{3D}=(X, Y, Z)^T$. The homogeneous representation $p_{3Dh}$ of the point $p_{3D}$ can be expressed as $p_{3Dh}=(p_{3D},1)^T$.

The projection of the homogeneous representation $p_{3Dh}$ onto the image plane B, which is denoted as $p_{imBh}$, can be expressed as follows:

$$p_{imBh} = P_B p_{3Dh} = (K_B \quad 0)\begin{pmatrix} p_{3D} \\ 1 \end{pmatrix} = K_B p_{3D} = \begin{pmatrix} x_B \\ y_B \\ 1 \end{pmatrix},$$

where $K_B$ is the calibration matrix of the camera associated with the image plane B. The, above equation can be expressed somewhat differently in the following form:

$$p_{imBh} = K_B p_{3D} = \begin{pmatrix} f_x X + p_x Z \\ f_y Y + p_y Z \\ Z \end{pmatrix} = Z^{-1}\begin{pmatrix} x_B \\ y_B \\ 1 \end{pmatrix}.$$

Since homogenous coordinates are defined only up to scale, the scaling factor $Z^{-1}$ can be omitted for providing the normalized homogeneous image coordinates $p_{imBh}=(x_B, y_B, 1)^T$. This normalized form can also be obtained directly in the following way:

$$p_{imBh} = Z^{-1} K_B p_{3D} = \begin{pmatrix} x_B \\ y_B \\ 1 \end{pmatrix}.$$

If the distance of the point from the camera is known, the projection can be inversed in the following way:

$$p_{3Dh} = \begin{pmatrix} K_B^{-1} \\ 0 \quad 0 \quad Z^{-1} \end{pmatrix} p_{imBh} = \begin{pmatrix} K_B^{-1} p_{imBh} \\ Z^{-1} \end{pmatrix} = \begin{pmatrix} K_B^{-1} Z^{-1} K_B p_{3D} \\ Z^{-1} \end{pmatrix} = Z^{-1}\begin{pmatrix} p_{3D} \\ 1 \end{pmatrix}.$$

Also, in this case the scale factor $Z^{-1}$ can be dropped. The point obtained in the way described above can then be projected onto the image plane A. However, since the image plane A has a different orientation than the image plane B, first a rotation R around the camera center C has to be performed for aligning the image plane A with the image plane B. This rotation R is defined by the angle $\theta$ between the image pane A and the image plane B and can be also expressed as a combination of rotations about the respective coordinate axes, i.e.:

$$R(\theta) = R_x R_y R_z.$$

The rotation can also be expressed in homogeneous coordinates as follows:

$$R_h = \begin{pmatrix} R(\theta) & 0 \\ 0 & 1 \end{pmatrix}.$$

Thus, the point $p_B$ in the image plane B can be projected or mapped to the corresponding point $p_A$ in the image plane A:

$$p_{imA} = (K_A \quad 0)\begin{pmatrix} R(\theta) & 0 \\ 0 & 1 \end{pmatrix}\begin{pmatrix} K_B^{-1} \\ 0 \quad 0 \quad Z^{-1} \end{pmatrix} p_{imBh}.$$

Thus, the homography matrix $H_{B2A}$ for transferring a point from the image plane B to the image plane B can be expressed as follows:

$$H_{B2A} = (K_A \quad 0)\begin{pmatrix} R(\theta) & 0 \\ 0 & 1 \end{pmatrix}\begin{pmatrix} K_B^{-1} \\ 0 \quad 0 \quad Z^{-1} \end{pmatrix} = K_A R(\theta) K_B^{-1}.$$

As can be seen from the above equation for determining the homography matrix $H_{B2A}$ the distance Z from the camera C drops out of the equation, as this information is not necessary for performing the homography.

For more details about the transformations described above reference is made to the textbook "Multiple View Geometry in Computer Vision", Richard Harley and Andrew Zisserman, second edition, Cambridge University Press, 2003, which is entirely incorporated herein by reference.

Thus, in an embodiment, the mapping or geometrical transformation implemented in the face extension unit 111 of the encoding apparatus 100 and the face extension unit 211 of the decoding apparatus 200 comprises the following steps: projecting the sample or point $p_B$ of the second face of the reference frame to the point $p_{3D}$ in three-dimensional space, wherein the point $p_{3D}$ lies on the line connecting the sample $p_B$ of the second face of the reference frame with the camera position C, performing a rotation for rotating the image plane B of the second face of the reference frame into a parallel orientation with the image plane A of the first face of the reference frame, and projecting the point $p_{3D}$ to the point $p_A$ in the image plane A of the first face of the reference frame, wherein the point $p_A$ in the image plane A of the first face of the reference frame defines an extension sample.

In a further embodiment, the mapping or geometrical transformation implemented in the face extension unit 111 of the encoding apparatus 100 and the face extension unit 211 of the decoding apparatus 200 is based on the following homography matrix $H_{B2A}$:

$$H_{B2A} = (K_A \quad 0)\begin{pmatrix} R(\theta) & 0 \\ 0 & 1 \end{pmatrix}\begin{pmatrix} K_B^{-1} \\ 0 \quad 0 \quad Z^{-1} \end{pmatrix} = K_A R(\theta) K_B^{-1}.$$

Figure 4:
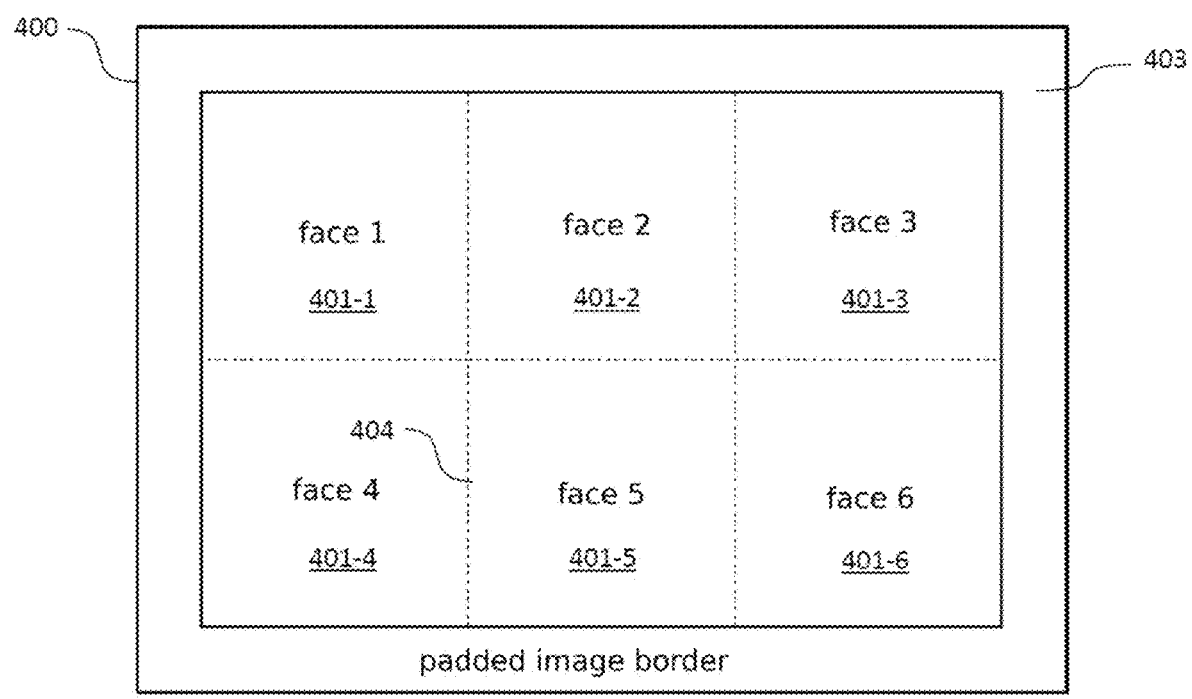
FIG. 4 shows a schematic diagram illustrating a frame of a video signal that can be processed by an encoding apparatus and a decoding apparatus.
Figure 5:
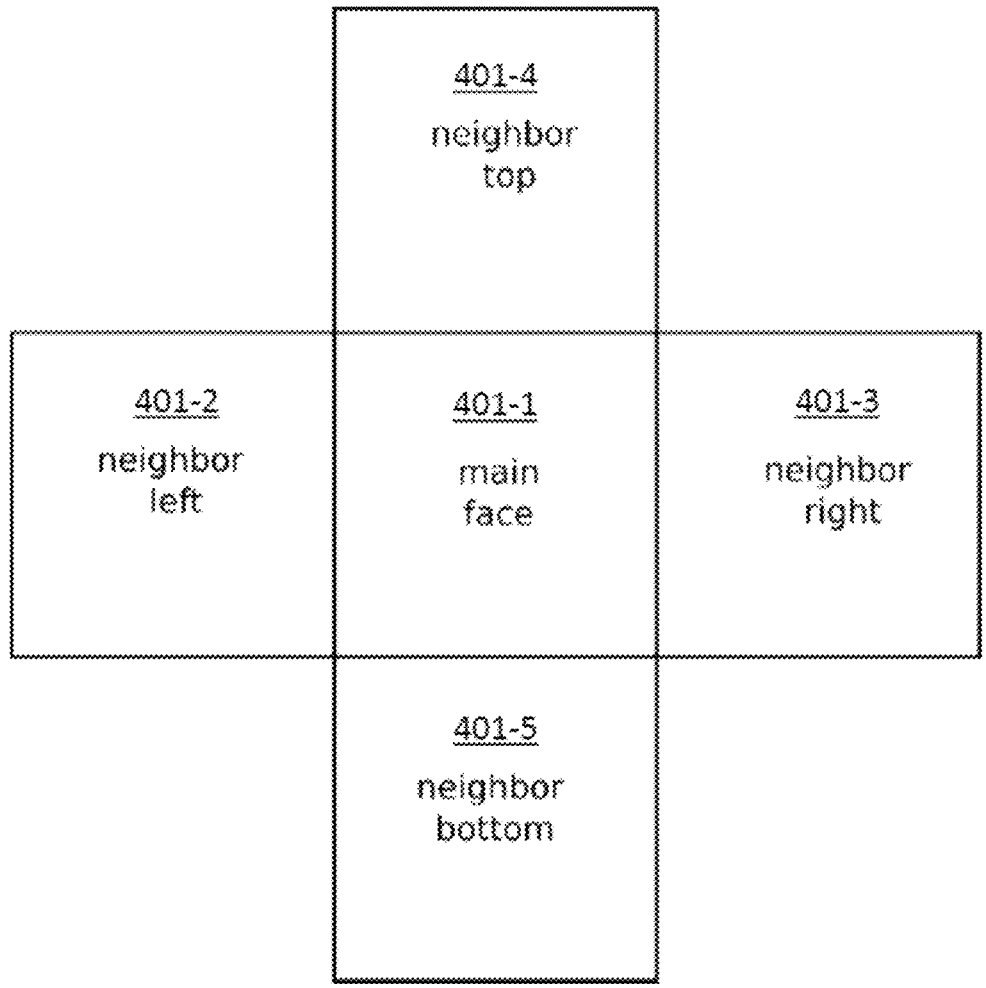
FIG. 5 shows a schematic diagram illustrating a geometrical relationship of the faces of a frame of a video signal that can be processed by an encoding apparatus.

In the following the above approach will be explained in the context of a 360° video signal, wherein the faces are the six faces of a cube, i.e. wherein the 360° video signal has been mapped to the six faces defining a cube. The faces or faces of the cube are arranged in a frame. One possible arrangement of a frame 400 is shown in FIG. 4, including the cube faces 401-1, ..., 401-6 and an padded image border 403. Every cube faces 401-1, ..., 401-6 can be defined to be a main face or face having four adjacent or neighboring faces, as shown in FIG. 5, where the cube face 401-1 has been selected as the main face. Without the geometrical corrections, there would be geometrical distortions across the borders of the faces shown in FIG. 5.

For the sake of simplicity, it is assumed that the resolution of the different cube faces is the same. Moreover, it is assumed that the respective principal points with coordinates $(p_x, p_y)^T$ lie in the center of the respective cube faces. In such an embodiment, the calibration matrices $K_A$ and $K_B$ can be expressed in the following way:

$$K_A = K_B = \begin{pmatrix} f & 0 & 0 \\ 0 & f & 0 \\ 0 & 0 & 1 \end{pmatrix}, \text{ and}$$

$$K_B^{-1} = \begin{pmatrix} f^{-1} & 0 & 0 \\ 0 & f^{-1} & 0 \\ 0 & 0 & 1 \end{pmatrix},$$

where f denotes a focal length, which can be determined using geometrical considerations, to be equal to w/2, wherein w denotes the width of a cube face in samples.

For this embodiment it is assumed that the image plane A of the first face coincides with the x-y plane of a Cartesian coordinate system, while the image plane B of the second face lies in the y-z plane thereof. In this embodiment, the rotation for aligning the image plane A with the image plane B is a rotation by 90° about the y axis. In this case, the homography matrix $H_{B2A}$ can be expressed in the following way:

$$\begin{aligned}
H_{B2A} &= K_A R_y(90°) K_B^{-1} \\
&= \begin{pmatrix} f & 0 & 0 \\ 0 & f & 0 \\ 0 & 0 & 1 \end{pmatrix} \begin{pmatrix} \cos(\theta) & 0 & \sin(\theta) \\ 0 & 1 & 0 \\ -\sin(\theta) & 0 & \cos(\theta) \end{pmatrix} \begin{pmatrix} f^{-1} & 0 & 0 \\ 0 & f^{-1} & 0 \\ 0 & 0 & 1 \end{pmatrix} \\
&= \begin{pmatrix} f & 0 & 0 \\ 0 & f & 0 \\ 0 & 0 & 1 \end{pmatrix} \begin{pmatrix} 0 & 0 & 1 \\ 0 & 1 & 0 \\ -1 & 0 & 0 \end{pmatrix} \begin{pmatrix} f^{-1} & 0 & 0 \\ 0 & f^{-1} & 0 \\ 0 & 0 & 1 \end{pmatrix} \\
&= \begin{pmatrix} f & 0 & 0 \\ 0 & f & 0 \\ 0 & 0 & 1 \end{pmatrix} \begin{pmatrix} 0 & 0 & 1 \\ 0 & f^{-1} & 0 \\ -f^{-1} & 0 & 0 \end{pmatrix} = \begin{pmatrix} 0 & 0 & f \\ 0 & 1 & 0 \\ -f^{-1} & 0 & 0 \end{pmatrix} \\
&= f^{-1} \begin{pmatrix} 0 & 0 & f^2 \\ 0 & f & 0 \\ -1 & 0 & 0 \end{pmatrix}
\end{aligned}$$

$$H_{B2A} = \begin{pmatrix} 0 & 0 & f^2 \\ 0 & f & 0 \\ -1 & 0 & 0 \end{pmatrix}.$$

Again, also here the scaling factor $f^{-1}$ can be dropped.

Thus, in an embodiment, the mapping or geometrical transformation implemented in the face extension unit 111 of the encoding apparatus 100 and the face extension unit 211 of the decoding apparatus 200 is based on the following homography matrix $H_{B2A}$:

$$H_{B2A} = \begin{pmatrix} 0 & 0 & f^2 \\ 0 & f & 0 \\ -1 & 0 & 0 \end{pmatrix}.$$

Figure 6:
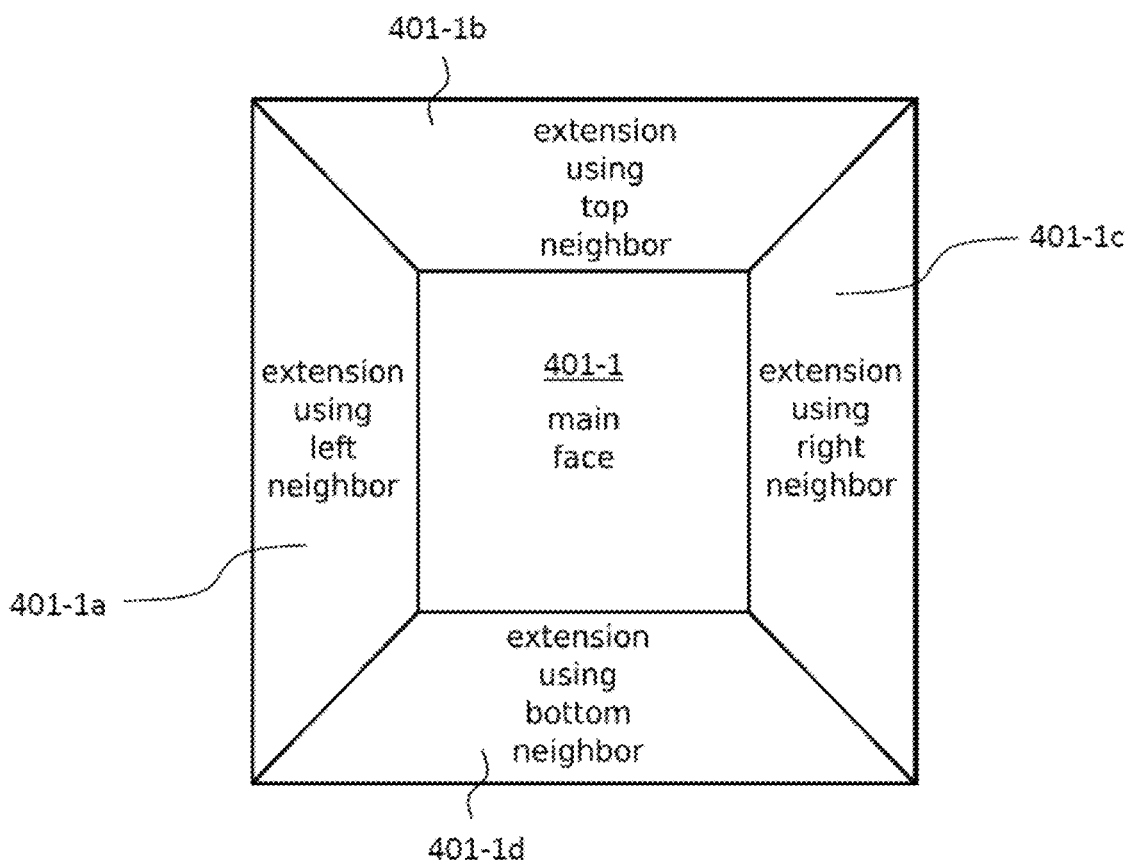
FIG. 6 shows a schematic diagram illustrating a face of a video signal including its extension regions as generated by an encoding apparatus and a decoding apparatus.

In an embodiment, each of the six cube faces 401-1, ..., 401-6 shown in FIG. 4 can be extended on the basis of sample values of samples of the respective adjacent faces. In FIG. 6 this is illustrated for the cube face 401-1, which can have an extension region 401-1a based on its left neighbor face 401-2, an extension region 401-1b based on its top neighbor face 401-4, an extension region 401-1c based on its right neighbor face 401-3, and an extension region 401-1d based on its bottom neighbor face 401-5.

In an embodiment, the extension regions can be always provided by the face extension unit 111 of the encoding apparatus 100 and the face extension unit 211 of the decoding apparatus 200 for inter frame prediction. One will appreciate, however, that the compensated block does not necessarily differ from the original block. For instance, for a block for which motion compensation shall be performed lies at the edge of a face (the main face in FIG. 5). The area in which the motion compensation is performed is extended on the basis of the location of the block which shall be predicted. The four neighboring faces can be used together with the main face to generate an extended face, i.e. the main face and its extension regions. The area of the main face is hereby not modified. Only the area around the main face is modified, it is generated from the other faces. As long as the motion compensation operates inside the main face 401-1 the behavior is the same as without the face extension. When the motion compensation is performed based on a motion vector which points to a position beyond the edge of the main face the behavior differs, here information from the extension regions is used.

Figure 7:
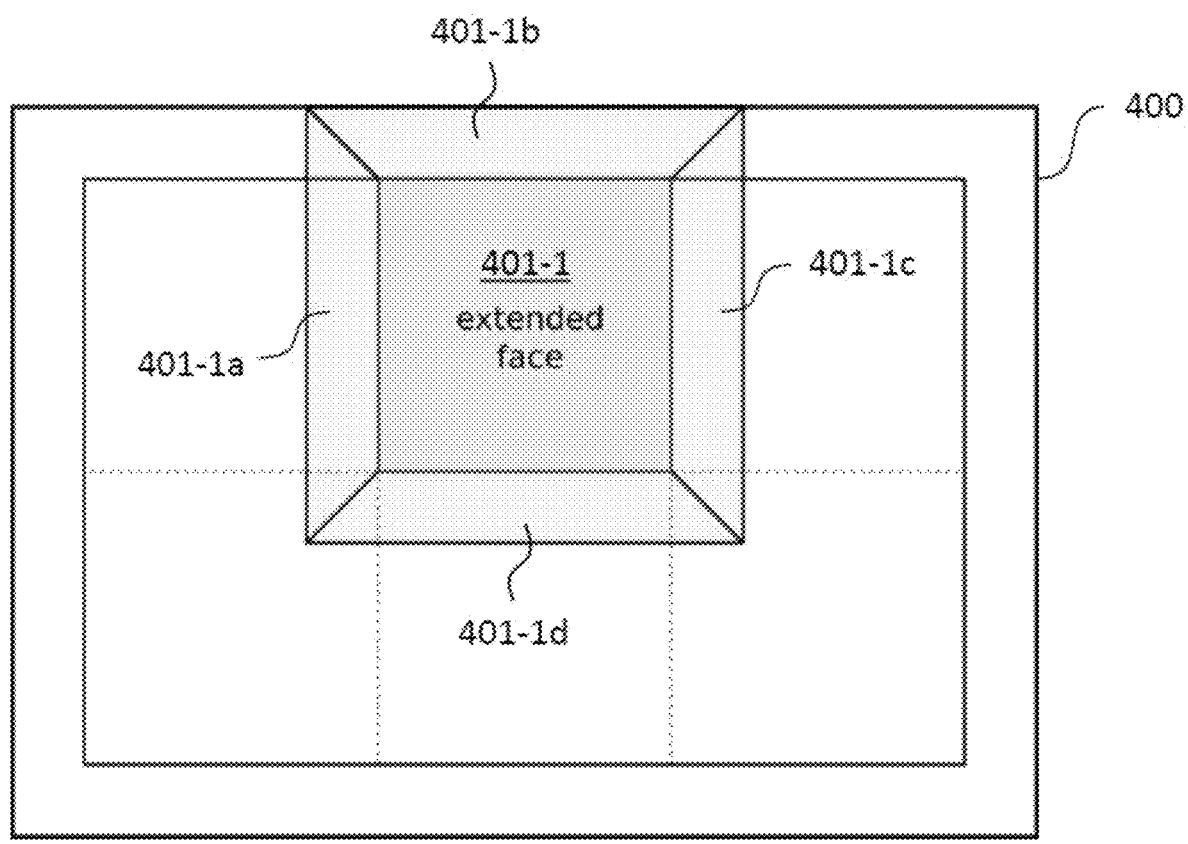
FIG. 7 shows a schematic diagram illustrating a face of a video signal including its extension regions within a frame as generated by an encoding apparatus and a decoding apparatus.

Similar homographies apply for the other faces. Each cube face can be extended in the manner described above. However, this can have the effect that extended regions overlap each other. Thus, in an embodiment, the extended regions can be stored in separate additional reference pictures or frames, as illustrated in FIG. 7. The reference picture which has to be used during encoding and decoding is derived based on the spatial location of the block which is currently processed. Thus, no additional signaling is needed (the number of pictures in the reference picture lists is unchanged). Although, in the example shown in FIG. 7 six reference pictures can be considered to be available now instead of one, only one is used for a given prediction block, as, in an embodiment, the block can be assigned to a single face and its corresponding extension regions (which, in turn, is determined by the location of the block). In an embodiment, this can be done by transparently replacing the reference picture used by the encoding apparatus 100 with the corresponding additional reference picture based on the location of the block which is processed. The encoding apparatus 100 and the decoding apparatus 200 are not "aware" that there are more reference pictures. The replacement only happens when the actual YUV buffer is accessed. The replacement can be performed for the past and future reference pictures in the reference picture list of the picture which shall be predicted.

Thus, embodiments increase the computational complexity only modestly. The additionally required operations amount to the creation of the extended regions. The memory requirement may increase, as 6 pictures are stored instead of one. This is however an issue of the particular implementation. More efficient embodiments may not need to store all of the additional 6 pictures, but could store only the data required for the small regions around each face. Another alternative embodiment consists in applying the extension for each block and search location. This would require no additional storage, however it would lead to additional computational complexity, as the compensation would have to be performed for each searched location.

Embodiments also account for the "wrapping around" of a 360° video signal. Each face border can be extended with information from its neighbors. This is also true for the face borders coinciding with the borders of the 360° image. As can be seen in FIG. 7, the extended face 401-1 requires no padding. Instead, the padding area can be filled with content of another cube face. The size of the extended region can be derived from the search range used by the encoding apparatus 100 during motion compensation such that its size matches the size of the picture border padding.

In the description above general principles of using extension regions have been discussed. However, all extended regions are not always required by the decoder. The simplest case is a sequence without movement. Skip mode can be used as no motion compensation needs to be performed. Consequently, the extended regions will never be used.

The simplest case mentioned above is an exception. Typically, there is a need for motion compensation. In order to reduce decoder complexity reductions following assumptions can be made. Firstly, it is likely that the movement across the boundary is consistent in time. If an object is inside the extended region in a future frame, it likely was inside the face in a past frame and vice versa. Consequently, only one extension is used. Secondly, if a "Before" reference picture is used the "After" reference picture does not need to be extended and vice versa. For the case of a moving camera, the motion across a face boundary is likely to be consistent for the whole face boundary. Thirdly, no motion vectors are coded for areas with very low texture, for example for the sky. This is explained further with regard description relating to FIGS. 11A-11D below.

Because of all extended regions are not always required by the decoder it is possible to include picture level face extension usage information in the encoded video signal so that the extension regions that are not needed do not generated. The picture level extension usage information thus includes information such as which extension regions are needed, the size of the extension region and how they can be derived efficiently from a reference frame without a need to encode and decode additional samples.

Figure 8:
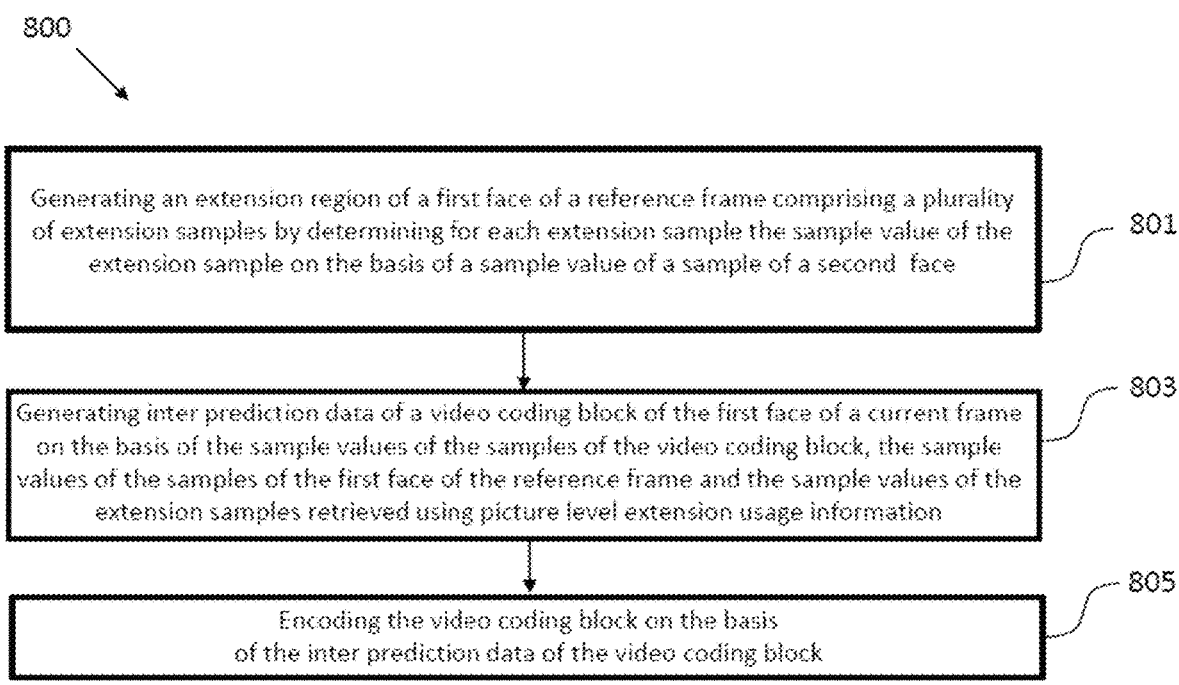
FIG. 8 shows a schematic diagram illustrating a method for encoding a video signal.

FIG. 8 shows a schematic diagram illustrating a method 800 for encoding a video signal according to an embodiment, wherein the video signal comprises a plurality of frames and each frame comprises a plurality of faces, including a first face and second face. Each face is associated with a different image plane and is dividable into a plurality of video coding blocks, wherein each video coding block comprises a plurality of samples and each sample is associated with a sample value.

The encoding method 800 comprises the following steps.

Step 801: Generating an extension region of the first face in a reference frame comprising a plurality of extension samples by determining the sample value of the extension sample on the basis of a sample value of a sample of the second face in the reference frame.

Step 803: Performing motion compensation of a video coding block of the first face in a current frame on the basis of the samples of the first face in the reference frame and the extension samples of the extension region retrieved according to picture level extension usage information.

Step 805: Generating an encoded video coding block in the current frame on the basis of the predicted video coding block.

In short, a face of a reference frame and an extension region generated from another face of the reference frame are used for encoding a current frame by inter-prediction.

Figure 9:
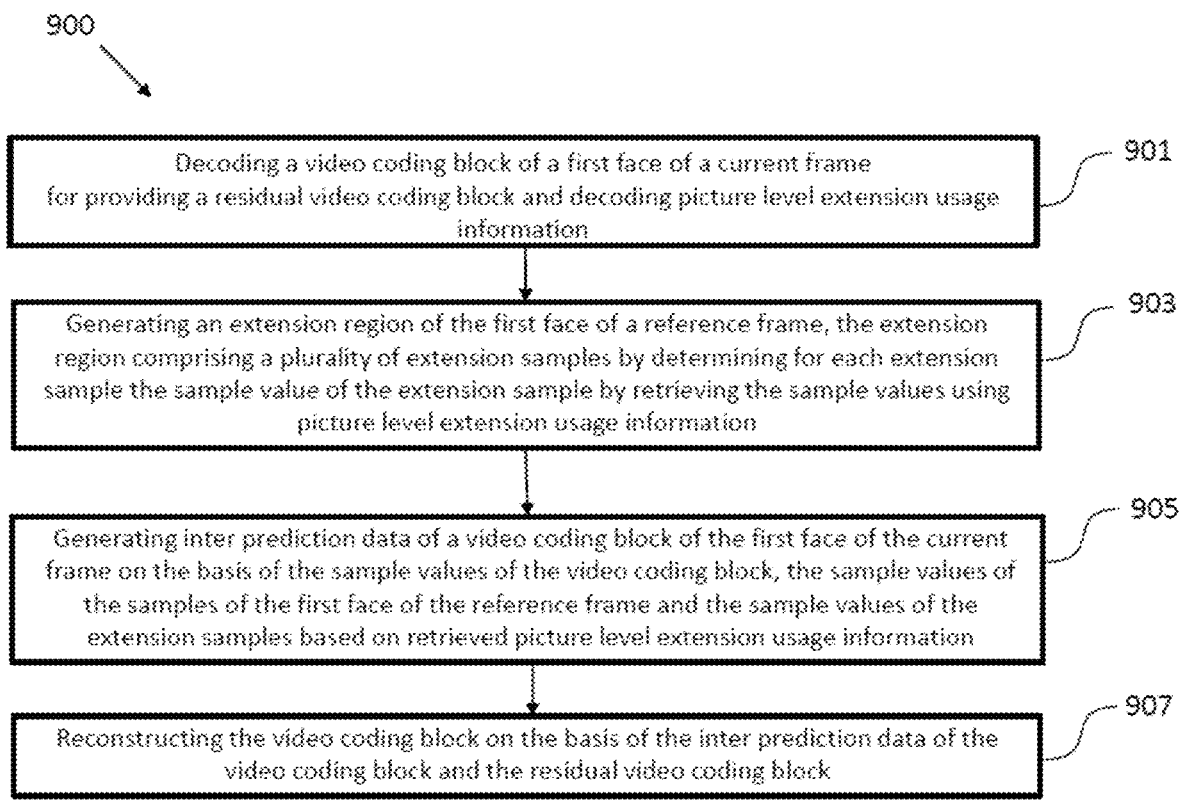
FIG. 9 shows a schematic diagram illustrating a method for decoding a video signal according to an embodiment.

FIG. 9 shows a schematic diagram illustrating a method 900 for decoding a video signal according to an embodiment, wherein the video signal comprises a plurality of frames and each frame comprises a plurality of faces, including a first face and second face. Each face is associated with a different image plane and is dividable into a plurality of video coding blocks, wherein each video coding block comprises a plurality of samples and each sample is associated with a sample value.

The decoding method 900 comprises the following steps.

Step 901: Decoding a video coding block of the first face in a current frame for providing a residual video coding block and decoding picture level extension usage information.

Step 903: Generating an extension region of the first face in a reference frame comprising a plurality of extension samples by determining the sample value of the extension sample by retrieving the sample values using picture level extension usage information.

Step 905: Performing motion compensation of the video coding block of the first face in the current frame on the basis of the samples of the first face in the reference frame and the extension samples of the extension region based on retrieved from picture level extension usage information.

Step 901: Reconstructing the video coding block in the current frame on the basis of the predicted video coding block and the residual video coding block.

Figure 10A:
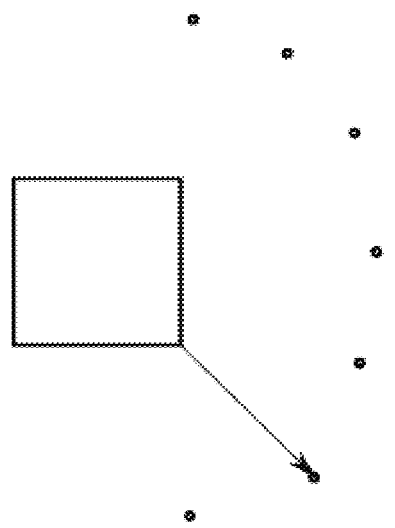
FIG. 10A illustrates pre-defined indexed points.
Figure 10B:
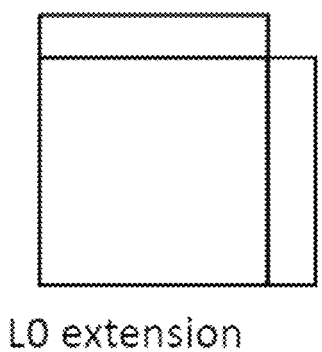
FIG. 10B shows L0 and inherited L1 extension areas.
Figure 10B:
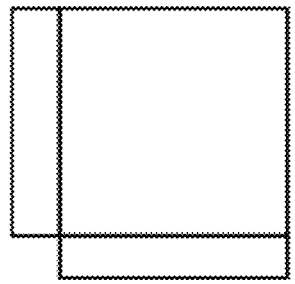

FIG. 10A illustrates an example set of points indexed by translation direction idx or rotation axis idx. These points are predefined. FIG. 10B illustrates L0 extension and inherited L1 extension. As can be seen from the figure inherited L1 extension is opposite of L0.

FIGS. 11A-11D show examples of a movement of a cube through a statics scene in 2D. The figures illustrate a view from the top to the four vertical faces of the cube. For the cases of pure translation of the cube, the motion of opposite faces is either the same or opposite. For the case of a rotating cube the motion on all faces is opposite to the rotation of the cube. These observations can be extended to 3D.

Figure 11A:
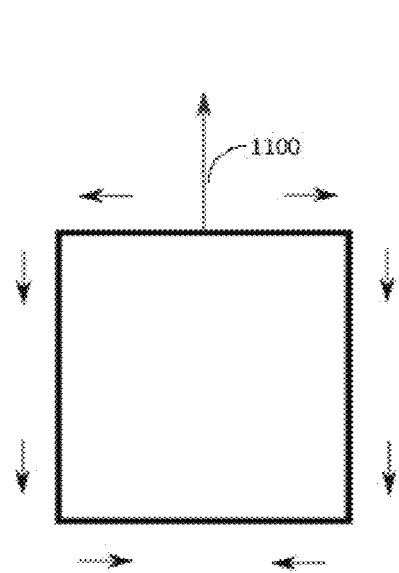
FIGS. 11A, 11B, 11C, and 11D show a movement of a cube through a statics scene in 2D.
Figure 11B:
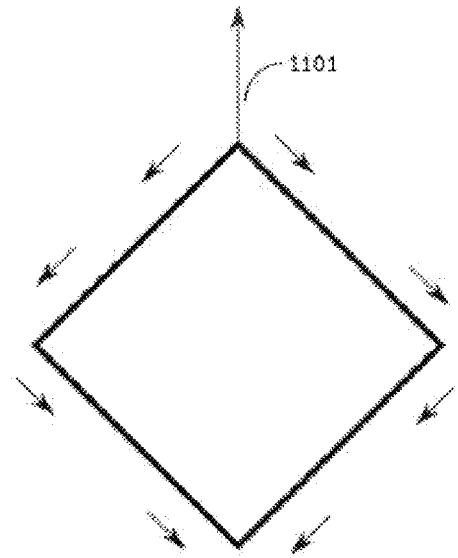
Figure 11C:
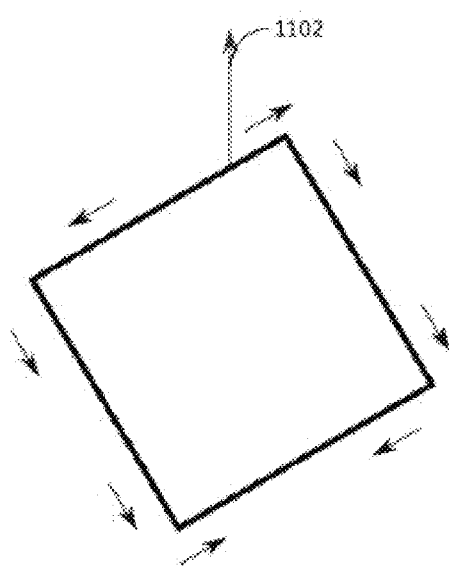
Figure 11D:
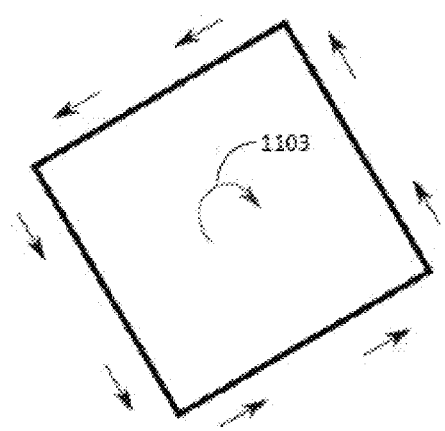

If FIG. 11A the cube is moving towards a face. The arrow 1100 illustrates the movement of the cube. Other arrows illustrate movement of a static scenery/texture relative to the cube faces. In FIG. 11B the cube is moving towards a corner. The arrow 1101 illustrates the movement of the cube. Other arrows illustrate movement of a static scenery/texture relative to the cube faces. In FIG. 11C the cube is moving towards a point on a face. Arrow 1102 illustrates the movement of the cube. Other arrows illustrate movement of a static scenery/texture relative to the cube faces. In FIG. 11D the cube is rotating. Arrow 1103 illustrates the rotation. Other arrows illustrate movement of a static scenery/texture relative to the cube faces.

Additionally, extension of a face is likely only necessary for one side of a boundary. For example, consider edge 404 in FIG. 4. If face 5 is extended along edge 404, using information from face 4, it is unlikely that face 4 needs to be extended along edge 404.

Figure 12A:
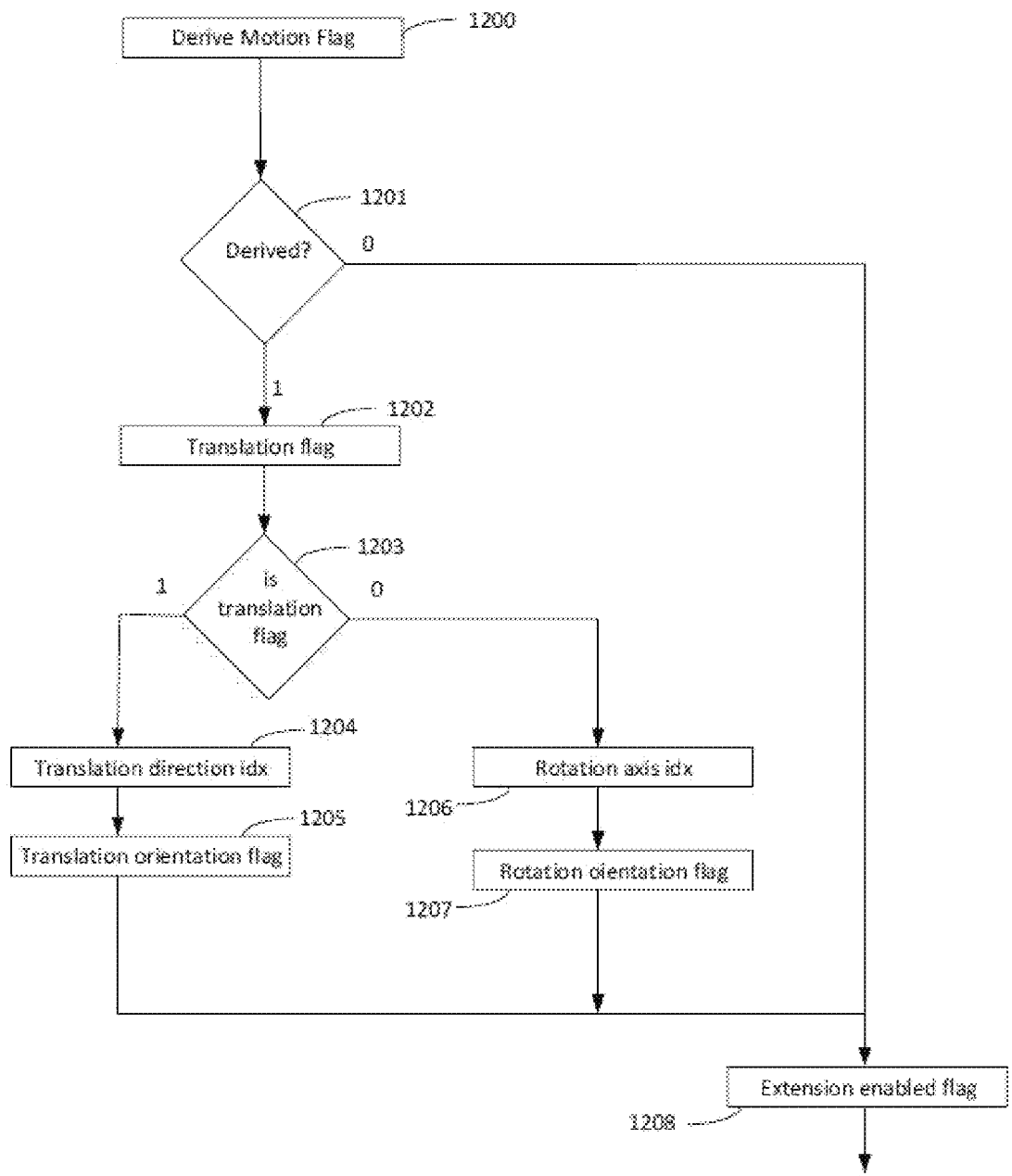
FIGS. 12A and 12B show a schematic diagram illustrating a method for deriving picture level extension usage information.

FIG. 12A discloses an example method showing principles of deriving picture level extension usage information. The principles may be used both in encoding and decoding. The method is initiated by determining if there is motion to be compensated, for example, by deriving a motion flag, step 1200. In step 1201 the value of the flag is determined. If the value is 1 (true), the method proceeds to deriving translation flag, step 1202. If the value is false, the method proceeds to deriving extension enabled flag, step 1208.

If the translation flag is set to 1, then the method proceeds to deriving translation direction index, step 1204 and translation orientation flag, step 1205. If the translation is set to 0, then the method continues by determining the rotation axis idx, step 1206 and rotation orientation flag, step 1217. Then, in both cases, the method proceeds to deriving extension enabled flag, step 1208. The illustration of the example continues in FIG. 12B.

Figure 12B:
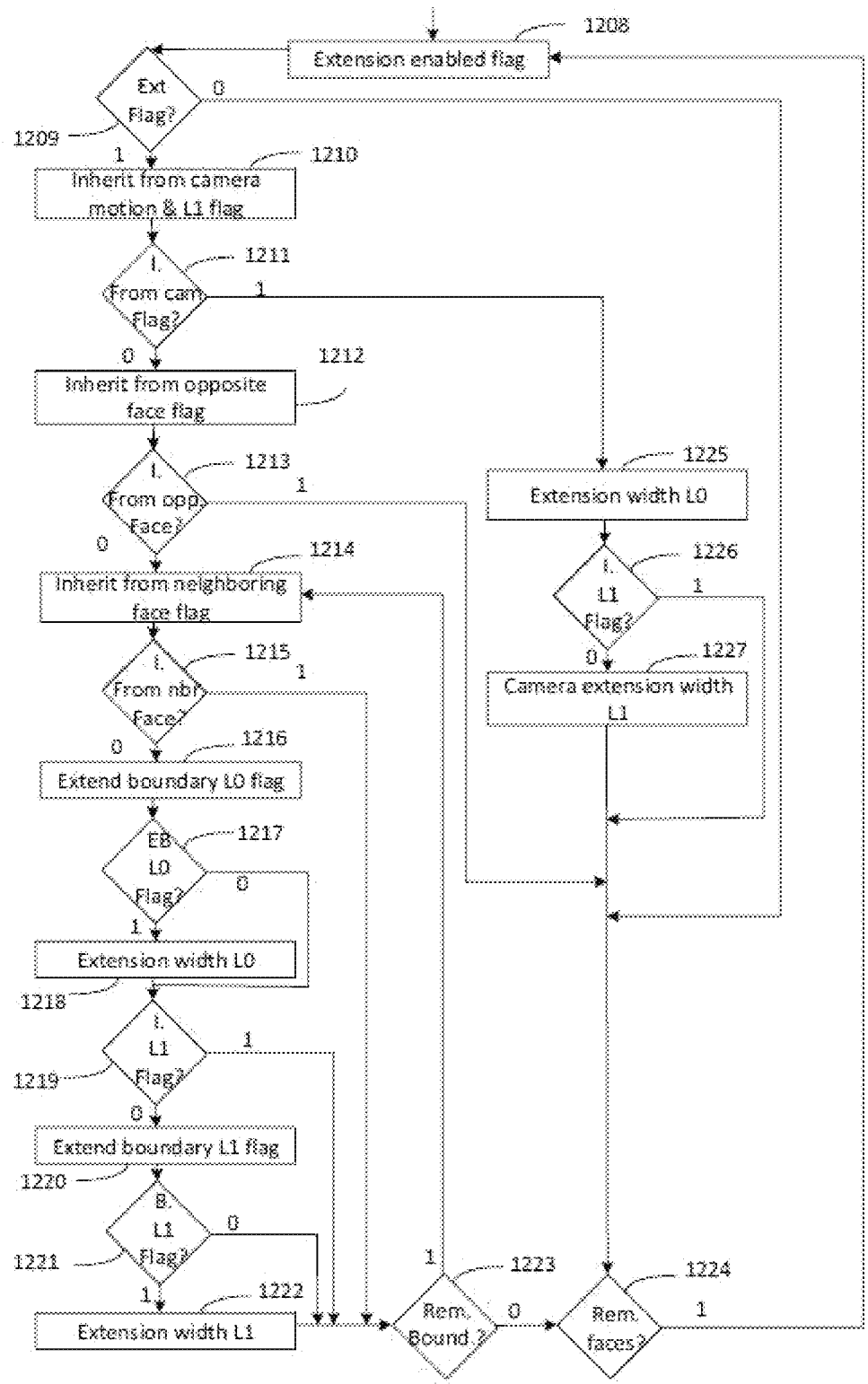

FIG. 12B shows step 1208 as a starting point, however, it is understood that this corresponds with the step of FIG. 12A and is not performed twice. Then, the value of extension enabled flag is tested, step 1209. If the value is 0 the method proceeds to step 1224, where it is tested if there are remaining faces left for processing. If the flag has value 1 the method proceeds to step 1210.

In step 1210 "inherit camera motion" flag and "inherit L1" flag are derived. Then, value of camera motion flag is tested, step 1211. If the value is 1 the method proceeds to step 1225, which will be explained below. If the value is 0, the method proceeds to step 1212.

In step 1212 "inherit from opposite face" flag is derived. Then, the value of the "inherit from opposite face" flag is tested, step 1213. If the value is 1, the method proceeds to step 1224 to check if there are remaining faces. If value is 0, the method proceeds to step 1214.

In step 1214 the "inherit from neighboring face" flag is derived. The derived flag value is then tested, step 1215. If the value is 1 the method proceeds to step 1223, wherein it is tested if there are remaining boundaries left. If the value is 1, then the method returns to step 1214. If there are no remaining boundaries left, i.e., all boundaries have been processed, the method proceeds to step 1224 to check if there are remaining faces left. If the value is 0, the method proceeds to step 1216.

In step 1216 extend boundary L0 flag is derived. Then, the extend boundary L0 flag is tested, step 1217. If the value is 1 then the extension width is set L0, step 1218. If the value is 0, then the step 1218 is skipped and the method proceeds directly to step 1219, wherein the "inherit L1" flag is tested. If the value is 1, then the method proceeds to step 1223 to check if there are remaining boundaries left. If the value is 0, the method proceeds to step 1220 to derive extend boundary L1 flag. The value of extend boundary L1 flag is then tested, step 1221. If the value is 0, then the method proceeds to step 1223. If value is 1, then the method proceeds to step 1223.

If the value of "inherit from camera motion" flag is tested to have value 1 at step 1211, then the method proceeds to step 1225, wherein the extension width is set to 1225. Then, the value of "inherit L1" flag is tested, step 1226. If the value is 1, the method proceeds to step 1224. If the value is 0, then the method proceeds to set the camera extension width L1, step 1227.

As above discussed the method eventually arrives at step 1224, wherein it is checked if there are remaining faces. If the value is 1, i.e. there are remaining faces left, the method proceeds back to step 1208.

In the following some examples of practical details are discussed. The picture level extension usage information carried using already existing normative information specifying the coding format and particularly the relation of the cube faces to each other. Such information could be for example be similar to the cube map projection SEI message. The cubemap projection SEI message provides information to enable remapping (through a cubemap projection) of the colour samples of the projected pictures onto a sphere coordinate space in sphere coordinates ($\phi$, $\theta$) for use in omnidirectional video applications for which the viewing perspective is from the origin looking outward toward the inside of the sphere. The sphere coordinates are defined so that $\phi$ is the azimuth (longitude, increasing eastward) and $\theta$ is the elevation (latitude, increasing northward).

Further it is assumed that there will be normative information on the face extension process, for example specifying the used interpolation method.

The usage of the face extension regions could be sent as normative information, for example as an SEI message as described above and/or in the PPS, and/or another parameter set. A possible way for signaling the extension usage would use the following parameters:

Indication if the extension usage information from a picture with a different picture order count (POC) can be reused (e.g. by persistence of SEI message or PPS selection).

Indication if the extension usage information can be derived from a signaled movement of the cube. The sphere can be quantized with a low number of points. Movement towards one of this points or rotation around an axis through it can be signaled. This may be sufficient to correctly derive which face boundaries need to be extended.

Indication whether reused or derived extension usage information should be adapted. Information for which faces such an adaptation is required.

For faces which require signaling or adaptation of the face extension usage information:

An indication whether the extension usage is derived from the opposite face.

An indication whether the extension usage is derived from the connected faces.

An indication for each face boundary specifying whether it should be extended.

Indication whether the extension usage of the future reference is derived from the past reference (information on past reference would be sent first).

Information for efficiently selecting one of the above ways of signaling the extension usage.

Information on the required size of the extension.

In the following an example of a possible syntax is shown. The syntax corresponds with the illustration of FIGS. 12A-12B. Thus, the syntax and the following semantics can be used for better understanding of the method of FIGS. 12A-12B. In the syntax following semantics are used:

derive_from_camera_motion_flag equal to 1 specifies that face usage parameters are derived from a signaled movement of the camera. derive_from_camera_motion_flag equal to 0 specifies that face usage parameters are not derived from the camera movement.

is_translation_flag equal to 1 specifies that the camera movement used for deriving the face usage parameters is a translation. is_translation_flag equal to 0 specifies that the camera movement used for deriving the face usage parameters is a rotation.

translation_direction_idx specifies the index of a previously defined set of 3D coordinates. The camera movement is along the line specified by this point and the cube center.

translation_orientation_flag equal to 1 specifies than the camera is moving towards the specified 3D coordinate. translation_orientation_flag equal to 0 specifies than the camera is moving away from the specified 3D coordinate.

rotation_axis_idx specifies the index of a previously defined set of 3D coordinates. The camera movement is a rotation around the line specified by this point and the cube center.

rotation_orientation_flag equal to 1 specifies than the camera is rotating clockwise around the specified rotation axis. rotation_orientation_flag equal to 0 specifies than the camera is rotating counter-clockwise around the specified rotation axis.

extension_enabled_flag equal to 1 specifies that face extension is enabled for face i. extension_enabled_flag equal to 0 specifies that face extension is disabled for face i, even if parameters were copied from already sent parameters or derived from a camera movement.

extension_width_L0 specifies the width of the extension for face i and boundary j. It is scaled with the POC distance.

Further the value of the extension width is quantized appropriately, e.g. in units of 4 samples or logarithmically.

extension_width_L1 specifies the width of the extension for face i and boundary j. It is scaled with the POC distance. Further the value of the extension width is quantized appropriately, e.g. in units of 4 samples or logarithmically.

camera_extension_width_L0 specifies the width of the extension to be applicable to all face boundaries that need to be extended due to the specified camera motion. It is scaled with the POC distance. Further the value of the extension width is quantized appropriately, e.g. in units of 4 samples or logarithmically.

camera_extension_width_L1 specifies the width of the extension to be applicable to all face boundaries that need to be extended due to the specified camera motion. It is scaled with the POC distance. Further the value of the extension width is quantized appropriately, e.g. in units of 4 samples or logarithmically.

inherit_from_camera_motion_flag equal to 0 specifies that parameters for the extension of face i are signaled explicity. inherit_from_camera_motion_flag equal to 1 specifies that parameters for the extension of face i are not signaled.

inherit_L1_flag equal to 1 specifies that the face usage parameters for the L1 reference picture are derived from the parameters of the L0 reference picture. inherit_L1_flag equal to 0 specifies that the face usage parameters for the L1 reference picture are signaled.

inherit_from_opposite_face_flag equal to 1 specifies that the face extension usage parameters for the face are inherited from the opposite face. inherit_from_opposite_face_flag equal to 0 specifies that no face extension usage parameters are inherited.

inherit_from_neighboring_face_flag equal to 1 specifies that the face extension usage parameters for the face are inherited from the neighboring face. inherit_from_neighboring_faces_flag equal to 0 specifies that no face extension usage parameters are inherited.

extend_boundary_L0_flag equal to 1 specifies that the boundary j of face i is extended. extend_boundary_L0_flag equal to 0 specifies that the boundary j of face i is not extended.

extend_boundary_L1_flag equal to 1 specifies that the boundary j of face i is extended. extend_boundary_L1_flag equal to 0 specifies that the boundary j of face i is not extended.

|  | Descriptor |
|---|---|
| ```
face_extension_usage( . . .) {
  derive_from_camera_motion_flag
  if( derive_from_camera_motion_flag ) {
    is_translation_flag
    if( is_translation_flag ) {
      translation_direction_idx
      translation_orientation_flag
    }
    else {
      rotation_axis_idx
      rotation_orientation_flag
    }
  }
  for( i =0; i < NumFaces; i++) { // NumFaces is inferred from other signaling
    extension_enabled_flag
    if( extension_enabled_flag ) {
      inherit_from_camera_motion_flag
      inherit_L1_flag
      if( !inherit_from_camera_motion_flag ) {
        inherit_from_opposite_face_flag
        if( !inherit_from_opposite_face_flag) {
          for( j =0; j < NumBoundaries; j++) {//
NumBoundaries is inferred from other signaling
  inherit_from_neighboring_face_flag
  if( !inherit_from_neighboring_face_flag) {
  extend_boundary_L0_flag
  if(extend_boundary_L0_flag ) {
  extension_width_L0_minus1
          }
          if( !inherit_L1_flag ) {
  extend_boundary_L1_flag
  if(extend_boundary_L1_flag ) {
  extension_width_L1_minus1
          }
         }
        }
       }
      }
     }
    else {
      camera_extension_width_L0_minus1
      if(!inherit_L1_flag) {
        camera_extension_width_L1_minus1
      }
    }
   }
  }
}
``` |  |

An alternative implementation of the extension usage information comprises at least the following picture level parameters such as which face boundary is extended and the size of the extended region in the PPS or other parameter set.

The proposed technique has been described herein mainly with reference to two faces, but can be readily adapted to a video signal with video content of more than two faces. Further, a face can be extended using image content from several other faces.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the methods and apparatuses beyond those described herein. While the present methods and apparatuses have been described with reference to one or more particular embodiments, those skilled in the art recognize that many changes may be made. It is therefore to be understood that within the scope of the appended claims and their equivalents, the disclosure may be practiced otherwise than as described herein.

As explained above, the arrangements for encoding and decoding a video signal may be implemented in hardware, such as the image coding apparatus as described above, or as a method. The method may be implemented as a computer program. The computer program is then executed in a computing device.

The arrangements for encoding and decoding a video signal have been described in conjunction with various embodiments herein. However, other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. An encoding apparatus configured to:
   generate an extension region of a first face of a reference frame of a video signal, wherein the first face comprises first image content of a first image plane, wherein the extension region comprises a plurality of extension samples, wherein a first sample value of each of the extension samples is based on a second sample value of a sample of a second face of the reference frame, and wherein the second face comprises second image content of a second image plane;
   determine a use of the extension region;
   provide, based on the use and the extension region, picture level extension usage information;
   perform a motion determination for a whole picture comprising the reference frame;
   encode the picture level extension usage information into an encoded video signal after performing the motion determination; and
   add the picture level extension usage information to a bitstream after finishing the motion determination for the whole picture.

2. The encoding apparatus of claim 1, further configured to:
   determine, from a first reference frame and a second reference frame, a movement across a face boundary to obtain a determination result; and
   encode, as a response to the movement and to provide a picture level extension, the determination result into the picture level extension usage information.

3. The encoding apparatus of claim 1, wherein the picture level extension usage information comprises at least one of the following:
   a first indication indicating a first possibility to reuse extension usage information of a picture with a different picture order count;
   a second indication indicating a second possibility to derive the extension usage information from a signaled movement;
   a third indication indicating a need to adapt reused information or derived information comprising a third face that requires an adaptation;
   a size of an extension; or
   a fourth indication indicating a fourth face to be extended.

4. The encoding apparatus of claim 3, wherein the picture level extension usage information further comprises at least one of the following:
   a fifth indication indicating whether the extension usage information is derived from an opposite face;
   a sixth indication indicating whether the extension usage information is derived from connected faces;
   a seventh indication, for each face boundary, indicating whether to be extended;
   an eighth indication indicating a past reference picture and a future reference picture; or a ninth indication indicating whether first extension usage information of the future reference picture is derived from second extension usage information of the past reference picture.

5. The encoding apparatus of claim 1, further configured to encode the picture level extension usage information in a supplemental enhancement information (SEI) message or in a picture parameter set (PPS).

6. A decoding apparatus configured to:
decode picture level extension usage information of an encoded video signal to obtain decoded extension usage information;
generate an extension region of a first face of a reference frame of the encoded video signal based on the decoded extension usage information, wherein the first face comprises first image content of a first image plane, wherein the extension region comprises a plurality of extension samples, wherein a first sample value of each of the extension samples is based on a second sample value of a sample of a second face of the reference frame, and wherein the second face comprises second image content of a second image plane;
perform a motion determination for a whole picture comprising the reference frame; and
decode the encoded video signal using the extension region after performing the motion determination,
wherein the picture level extension usage information comprises at least one of the following:
a first indication indicating a first possibility to reuse extension usage information of a picture with a different picture order count;
a second indication indicating a second possibility to derive the extension usage information from a signaled movement;
a third indication indicating a need to adapt reused information or derived information comprising a third face that requires an adaptation;
a required size of an extension; or
a fourth indication indicating a fourth face to be extended.

7. The decoding apparatus of claim 6, wherein the picture level extension usage information further comprises at least one of the following:
a fifth indication indicating whether the extension usage information is derived from an opposite face;
a sixth indication indicating whether the extension usage information is derived from connected faces;
a seventh indication, for each face boundary, indicating to be extended;
an eighth indication indicating a past reference picture and a future reference picture; or
a ninth indication indicating whether first extension usage information of the future reference picture is derived from second extension usage information of the past reference picture.

8. The decoding apparatus of claim 6, further configured to decode the picture level extension usage information from a supplemental enhancement information (SEI) message or from a picture parameter set (PPS).

9. A method comprising:
generating an extension region of a first face of a reference frame of a video signal, wherein the first face comprises first image content of a first image plane, wherein the extension region comprises a plurality of extension samples, wherein a first sample value of each of the extension samples is based on a second sample value of a sample of a second face of the reference frame, and wherein the second face comprises second image content of a second image plane;
determining a use of the extension region;
providing, based on the use and the extension region, picture level extension usage information;
performing a motion determination for a whole picture comprising the reference frame;
encoding the picture level extension usage information into an encoded video signal after performing the motion determination; and
adding the picture level extension usage information to a bitstream after finishing the motion determination for the whole picture.

10. The method of claim 9, wherein the picture level extension usage information comprises at least one of the following:
a first indication indicating a first possibility to reuse extension usage information of a picture with a different picture order count;
a second indication indicating a second possibility to derive the extension usage information from a signaled movement;
a third indication indicating a need to adapt reused information or derived information comprising a third face that requires an adaptation;
a required size of an extension; or
a fourth indication indicating a fourth face to be extended.

11. The method of claim 10, wherein the picture level extension usage information further comprises at least one of the following:
a fifth indication indicating whether the extension usage information is derived from an opposite face;
a sixth indication indicating whether the extension usage information is derived from connected faces;
a seventh indication, for each face boundary, indicating whether to be extended;
an eighth indication indicating a past reference picture and a future reference picture; or
a ninth indication indicating whether first extension usage information of the future reference picture is derived from second extension usage information of the past reference picture.

12. The method of claim 9, further comprising encoding the picture level extension usage information in a supplemental enhancement information (SEI) message or in a picture parameter set (PPS).

13. A method comprising:
decoding picture level extension usage information of an encoded video signal to obtain decoded extension usage information;
generating an extension region of a first face of a reference frame of the encoded video signal based on the decoded extension usage information, wherein the first face comprises first image content of a first image plane, wherein the extension region comprises a plurality of extension samples, wherein a first sample value of each of the extension samples is based on a second sample value of a sample of a second face of the reference frame, and wherein the second face comprises second image content of a second image plane;
performing a motion determination for a whole picture comprising the reference frame; and
decoding the encoded video signal using the extension region after performing the motion determination,
wherein the picture level extension usage information further comprises at least one of the following:

a first indication indicating a first possibility to reuse extension usage information of a picture with a different picture order count;

a second indication indicating a second possibility to derive the extension usage information from a signaled movement;

a third indication indicating a need to adapt reused information or derived information comprising a third face that requires an adaptation;

a required size of an extension; or a fourth indication indicating a fourth face to be extended.

14. The method of claim 13, wherein the picture level extension usage information further comprises at least one of the following:

a fifth indication indicating whether the extension usage information is derived from an opposite face;

a sixth indication indicating whether the extension usage information is derived from connected faces;

a seventh indication, for each face boundary, indicating whether to be extended;

an eighth indication indicating a past reference picture and a future reference picture; and a ninth indication indicating whether first extension usage information of the future reference picture is derived from second extension usage information of the past reference picture.

15. The method of claim 13, further comprising decoding the picture level extension usage information from a supplemental enhancement information (SEI) message.

16. The method of claim 13, further comprising decoding the picture level extension usage information from a picture parameter set (PPS).

* * * * *